Feb. 10, 1959

T. E. SHOUP 2,873,354

METHOD OF MAKING A HEAT EXCHANGER

Filed Aug. 23, 1954

INVENTOR.
BY Thomas E. Shoup
Clyde H. Haynes
his atty.

United States Patent Office 2,873,354
Patented Feb. 10, 1959

2,873,354
METHOD OF MAKING A HEAT EXCHANGER

Thomas E. Shoup, Amherst, Ohio, assignor to Gregory Industries, Inc., Detroit, Mich., a corporation of Michigan Application August 23, 1954, Serial No. 451,338

2 Claims. (Cl. 219—104)

This invention relates to heat exchangers and to the method of manufacturing heat exchangers.

In the past, heat exchangers have been manufactured by forming the heat exchanger housing of walls and welding fins on those walls for radiating heat transmitted through the walls. Many times the heat exchanger housing was very small or of a design making it difficult to put fins on the one side of the housing. This is particularly true if the housing was a small pipe or if the working space was too small to manipulate welding rods. These problems have been eliminated by the present invention which has for one of its objects the method of manufacturing a heat exchanger by putting a plurality of holes in the wall, fitting members in these holes which extend outwardly from one side of the wall and then welding studs onto the members and the wall on the other side of the wall. The members extending from one side of the wall or into the housing and the studs on the other side of the wall or outside of the housing effectively increase the surface or radiating area of the heat exchanger.

Another object of the invention is to provide a heat exchanger wall with a hole wherein a member fitted in the hole extends outwardly from the wall on one side and a stud is end arc welded to the member and the wall around the member to completely seal the hole in the wall with the stud extending outwardly from the wall on the side opposite the member.

Another object of the invention is to construct a heat exchanger wall having projections on both sides thereof which are welded to the wall and the whole operation is performed from one side of the wall only.

Another object of the invention is to have the member extending from one side of the wall of the heat exchanger housing and the stud extending from the other side of the wall aligned and integrally joined together throughout their cross sectional area and to the wall by weld metal.

Other objects and a full understanding of the invention will become apparent from the description and claims and the drawings in which:

Figure 1:
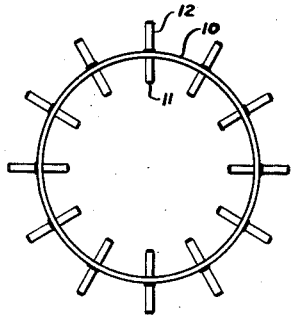
Figure 1 is a plan view of the end of a heat exchanger tube showing the members on the inside of the tube and the studs on the outside of the tube.

In the present description the term heat exchanger is used in its broadest sense to include structures wherein the heat generated on one side of a wall is to be radiated from the opposite side of the wall. Such structures can be in the form of tubes, as illustrated in Figure 1, open-hearth doors, large tanks, conduits, piping and other usable configurations. For simplicity of description the heat exchanger illustrated in Figure 1 is of a tubular shape since it contains wall elements and the studs and members the same as the other type of heat exchangers.

In the heat exchanger illustrated in Figure 1 the enclosure wall is referred to by the character 10. On the inside of this enclosure wall 10 are members 11 and on the outside of the wall 10 are the studs 12. The members 11 extend outwardly from the wall on one side thereof, or in this instance inwardly towards the center of the tubular enclosure and the studs 12 extend outwardly from the wall on the side opposite the members. The members 11 and 12 are aligned since they are welded together and to the enclosure wall 10.

Figure 2:
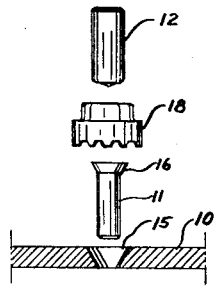
Figure 2 is a fragmentary exploded view of the component parts used to make the heat exchanger wall.

In manufacturing the device as illustrated, the enclosure wall 10 is first provided with a hole 15 as illustrated in Figure 2. In this case the hole 15 is tapered with a larger diameter being on the stud side of the wall 10. The member 11 is provided with a tapered head 16 to engage the periphery of the hole 15 the member 11 is then inserted through the hole to extend it into the enclosure. After the member is inserted in the hole 15, the stud 12 is end arc welded to it. The stud 12 may be of any commercially available design which has a cross sectional area at least as large as the cross sectional area of the body of the member 11. In the assembly illustrated in Figures 2, 3 and 4 the stud 12 has a larger cross sectional area than the member 11. Both the stud and the member may be of any desired shape, however, a cylindrical shape is most economical to use from the manufacturing standpoint of the stud and pin and also from the ease of making the hole 15.

Figure 3:
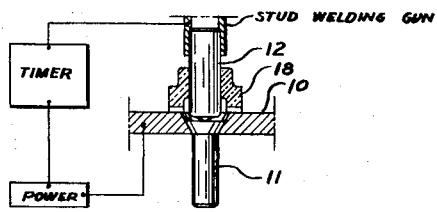
Figure 3 is a fragmentary view partly in section illustrating the parts in position for welding to form the heat exchanger wall.
Figure 4:
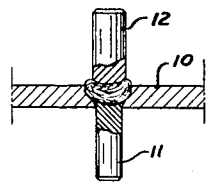
Figure 4 is a fragmentary cross section view showing the welded joint of the heat exchanger wall.

The stud 12 is actually positioned against the head 16 as illustrated in Figure 3 during the welding operation. The welding end of the stud 12, which may be inserted and supported by a stud welding gun such as illustrated in Nelson Patent No. 2,413,189 is enclosed by a welding ferrule 18. The resultant weld obtained is illustrated in Figure 4. The actual weld metal completely seals the hole and integrally joins the stud 12, the member 11 and the wall 10. The stud 12 and the member 11 are welded together by this weld metal throughout their cross sectional area and are welded by the same weld metal to the wall completely around the periphery of the hole or around the stud and member.

It is noted that all of the operations for manufacturing this enclosure wall for a heat exchanger are performed from one side of the wall. The member 11 is inserted through the hole 15 from the same side of the wall that the hole was drilled and from the same side of the wall that the stud is welded to. This makes it possible to have the members or projections 11 on the inside of the small tube or extending into a small space where it would otherwise be impractical to weld fins to the wall.

Figure 5:
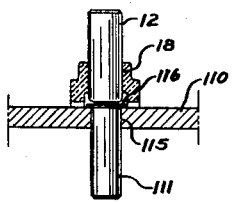
Figure 5 is a fragmentary view partly in section illustrating a modification of the parts.
Figure 6:
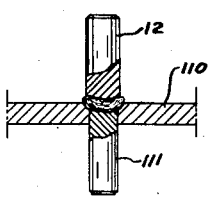
Figure 6 is a cross sectional view illustrating the welded joint obtained by using the parts illustrated in Figure 5.

The structure of Figures 5 and 6 are very similar to that of Figures 2, 3 and 4 but illustrate the use of a straight hole 115 in the wall 110 and a member 111 which has a small head 116. In this instance the head 116 is thin and seats against the wall around the periphery of the hole whereas in Figures 2 and 3 the head 16 fits down into the hole in the wall. As in the preferred embodiment, the stud 12 is integrally joined to the member 111 and the wall 110 by weld metal (see Figure 6). The method of assembling the parts in welding is the same as in the preferred embodiment.

Figure 7:
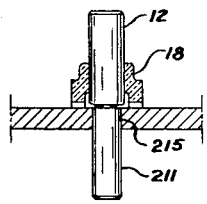
Figure 7 illustrates another modification of the parts used in the invention.

In the structure in Figure 7 the head has been entirely eliminated from the member so that a straight rod 211 may be used for the member. The rod 211 is frictionally fitted in the hole 215 which is straight walled and may be drilled into the wall. The method of constructing this assembly and the results obtained are again very similar to that of Figures 2, 3 and 4. The weld metal (not shown) integrally joins the member and the stud throughout the cross sectional area and integrally joins them to the wall which forms the heat exchanger.

It is understood that the materials used may be of any metal or material which can be end arc welded and that the members may be of any suitable size and shape. The exact size and shape of the parts including the members and the studs is dependent on the exact purpose of the heat exchanger.

Although this invention has been described in its preferred form with a certain degree of particularity enabling others to reproduce the invention, it is understood that the present disclosure has been made by way of example and that numerous modifications and changes in the details may be resorted to without departing from the spirit and scope of the invention as defined in the claims which are made a part hereof.

The embodiments of the invention in which an exclusive property or privilege is claimed are defined as follows:

1. In a method of manufacturing a heat exchanger wherein welding is possible only from the exterior of an enclosure, the steps of; forming the enclosure from wall means of weldable material, providing said wall means with at least one through passage hole, mechanically fitting one end of a metal member in said hole with the member extending into the enclosure, thereafter positioning a stud having a cross-sectional area at least equal to that of the member into the external opening of said hole in electrical relationship and in coaxial alignment with the end of the member, thereafter weld melting the end of the member and the wall around the member and the entire adjacent end of the stud, and finally allowing the welded molten portions to solidify to integrally join the member to the stud throughout their cross-sectional area and to the wall means entirely around the periphery of the member with a single mass of weld metal.

2. The method of claim 1 wherein the wall means are provided with tapered holes and the metal members are provided with tapered heads which prevent the metal members from falling through the holes during welding.

References Cited in the file of this patent

UNITED STATES PATENTS

| | | |
|---|---|---|
| 555,131 | Thomson | Feb. 25, 1896 |
| 2,244,800 | Pascale | June 10, 1941 |
| 2,416,204 | Nelson | Feb. 18, 1947 |
| 2,566,318 | Dalin et al. | Sept. 4, 1951 |